(12) United States Patent
Kerschbaum et al.

(10) Patent No.: US 9,342,707 B1
(45) Date of Patent: May 17, 2016

(54) SEARCHABLE ENCRYPTION FOR INFREQUENT QUERIES IN ADJUSTABLE ENCRYPTED DATABASES

(71) Applicants: Florian Kerschbaum, Karlsruhe (DE); Martin Haerterich, Wiesloch (DE); Isabelle Hang, Karlsruhe (DE); Mathias Kohler, Stutensee (DE); Andreas Schaad, Bruchsal (DE); Axel Schroepfer, Rheinstetten (DE); Walter Tighzert, Heidelberg (DE)

(72) Inventors: Florian Kerschbaum, Karlsruhe (DE); Martin Haerterich, Wiesloch (DE); Isabelle Hang, Karlsruhe (DE); Mathias Kohler, Stutensee (DE); Andreas Schaad, Bruchsal (DE); Axel Schroepfer, Rheinstetten (DE); Walter Tighzert, Heidelberg (DE)

(73) Assignee: SAP SE, Walldorf (DE)

( * ) Notice: Subject to any disclaimer, the term of this patent is extended or adjusted under 35 U.S.C. 154(b) by 96 days.

(21) Appl. No.: 14/534,851

(22) Filed: Nov. 6, 2014

(51) Int. Cl.
*G06F 7/00* (2006.01)
*G06F 21/62* (2013.01)
*G06F 17/30* (2006.01)

(52) U.S. Cl.
CPC ...... *G06F 21/6227* (2013.01); *G06F 17/30477* (2013.01)

(58) Field of Classification Search
USPC .................. 380/28, 210, 270, 279; 726/6, 28; 713/150, 189, 193, 323
See application file for complete search history.

(56) References Cited

U.S. PATENT DOCUMENTS

| | | | |
|---|---|---|---|
| 7,818,200 B2 | 10/2010 | Kerschbaum et al. |
| 7,836,483 B2 | 11/2010 | Kerschbaum et al. |
| 7,860,244 B2 | 12/2010 | Kerschbaum |
| 7,860,245 B2 | 12/2010 | Kerschbaum et al. |
| 7,869,598 B2 | 1/2011 | Kerschbaum |
| 7,986,780 B2 | 7/2011 | Kerschbaum et al. |
| 7,995,750 B2 | 8/2011 | Kerschbaum et al. |
| 8,010,782 B2 | 8/2011 | Kerschbaum |
| 8,015,080 B2 | 9/2011 | Kerschbaum et al. |
| 8,045,711 B2 | 10/2011 | Kerschbaum et al. |
| 8,060,758 B2 | 11/2011 | Kerschbaum et al. |
| 8,130,947 B2 | 3/2012 | Kerschbaum et al. |
| 8,131,999 B2 | 3/2012 | Kerschbaum |
| 8,150,041 B2 | 4/2012 | Kerschbaum |
| 8,291,509 B2 | 10/2012 | Kerschbaum et al. |
| 8,321,666 B2 | 11/2012 | Kerschbaum |
| 8,365,298 B2 | 1/2013 | Kerschbaum et al. |

(Continued)

OTHER PUBLICATIONS

Kerschbaum, et al. "Searchable Encryption for Infrequent Queries in Adjustably Encrypted Databases", SIGMOD'14, Jun. 22-27, 2014, Snowbird, Utah, 12 pages.

*Primary Examiner* — Joseph P Hirl
*Assistant Examiner* — Sayed Beheshti Shirazi
(74) *Attorney, Agent, or Firm* — Fish & Richardson P.C.

(57) ABSTRACT

Methods, systems, and computer-readable storage media for selecting columns for selecting encryption to perform an operator during execution of a database query. Implementations include actions of determining a current encryption type of a column that is to be acted on during execution of the database query, the column storing encrypted data, determining a minimum encryption type for performance of the operator on the column, selecting a selected encryption type based on the current encryption type, the minimum encryption type, and a budget associated with the column, and performing the operator based on the selected encryption type.

20 Claims, 4 Drawing Sheets

(56) References Cited

U.S. PATENT DOCUMENTS

| | | | |
|---|---|---|---|
| 8,473,741 B2* | 6/2013 | Kerschbaum | G06Q 30/06 380/255 |
| 8,526,603 B2* | 9/2013 | Kerschbaum | H04L 9/008 380/30 |
| 8,533,487 B2 | 9/2013 | Kerschbaum et al. | |
| 8,538,799 B2* | 9/2013 | Haller | G06Q 10/06311 705/7.38 |
| 8,548,172 B2* | 10/2013 | Kerschbaum | H04L 63/062 380/281 |
| 8,572,405 B2* | 10/2013 | Kerschbaum | H04L 9/00 380/255 |
| 8,584,232 B2 | 11/2013 | Kerschbaum | |
| 8,688,973 B2* | 4/2014 | Kerschbaum | H04L 9/002 380/282 |
| 8,731,199 B2* | 5/2014 | Jawurek | H04L 9/3221 380/268 |
| 8,811,620 B2* | 8/2014 | Chaves | G06F 21/6218 380/277 |
| 8,839,410 B2* | 9/2014 | Kerschbaum | G06F 8/42 380/28 |
| 2008/0101604 A1* | 5/2008 | Kocher | G11B 20/00086 380/210 |
| 2008/0263650 A1* | 10/2008 | Kerschbaum | G06F 21/6218 726/9 |
| 2009/0055382 A1* | 2/2009 | Kerschbaum | G06Q 10/06 |
| 2010/0106980 A1* | 4/2010 | Kerschbaum | H04L 9/3013 713/193 |
| 2010/0329464 A1* | 12/2010 | Kerschbaum | G06Q 10/087 380/279 |
| 2012/0121080 A1* | 5/2012 | Kerschbaum | H04L 9/085 380/28 |
| 2012/0281832 A1* | 11/2012 | Matalgah | H04L 9/0631 380/270 |
| 2013/0275743 A1* | 10/2013 | Jawurek | H04L 9/008 713/150 |
| 2013/0297929 A1 | 11/2013 | Chaves et al. | |
| 2013/0297959 A1* | 11/2013 | Simon | H02J 3/14 713/323 |
| 2014/0130173 A1* | 5/2014 | Kerschbaum | G06F 21/125 726/26 |

* cited by examiner

SEARCHABLE ENCRYPTION FOR INFREQUENT QUERIES IN ADJUSTABLE ENCRYPTED DATABASES

BACKGROUND

Encrypted databases provide data protection (security) in cloud platforms and/or database-as-a-service settings. In encrypted databases, data can be encrypted at the client and can be provided to the database for storage. Adjustable encryption has been introduced for processing queries on encrypted data, while protecting sensitive data stored in the (cloud) database. During adjustable encryption, a database column is adjusted to a necessary level of encryption, e.g. order-preserving encryption, for a set of executed queries. In some cases, the encryption level is not reversed. This has the drawback that long running databases will eventually transform into only order preserving encrypted databases.

SUMMARY

Implementations of the present disclosure include computer-implemented methods for encryption selection for querying of databases storing encrypted data. In some implementations, actions include determining a current encryption type of a column that is to be acted on during execution of the database query, the column storing encrypted data, determining a minimum encryption type for performance of the operator on the column, selecting a selected encryption type based on the current encryption type, the minimum encryption type, and a budget associated with the column, and performing the operator based on the selected encryption type. Other implementations of this aspect include corresponding systems, apparatus, and computer programs, configured to perform the actions of the methods, encoded on computer storage devices.

These and other implementations can each optionally include one or more of the following features: actions further include determining the budget associated with the column based on a previous budget associated with the column and a cost parameter; actions further include one of setting the cost parameter to a first value, if the minimum encryption type is deterministic encryption, and setting the cost parameter to a second value, if the minimum encryption type is order-preserving encryption; the selected encryption type is the minimum encryption type, and is selected in response to determining that the budget is less than or equal to the cost parameter; the selected encryption type is searchable encryption, and is selected in response to determining that the budget is not less than or equal to the cost parameter; the selected encryption type is the minimum encryption type, and is selected in response to determining that the current encryption type is less than or equal to the minimum encryption type; and the budget is provided in terms of time.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to encryption selection for querying of databases storing encrypted data. More specifically, implementations of the present disclosure provide budget-based encryption selection as part of query planning for making an appropriate choice between, for example, searchable encryption and deterministic encryption, or order-preserving encryption. In this manner, searchable encryption is provided as an alternative, and maintains security while only marginally impacting performance when applied only to infrequent queries.

In order to protect data stored in databases, e.g., cloud databases maintained by third-parties, data can be processed in encrypted form. In some examples, order-preserving encryption (OPE) is used to process encrypted data. For example, OPE enables queries, e.g., structured query language (SQL) queries, to be processed without modification. In order to increase security, adjustable encryption can be provided, and includes layering of encryption in onions. In adjustable encryption, queries are analyzed and the encryption layer is adjusted before query execution. In this manner, only the layers necessary for query execution, e.g. deterministic encryption instead of OPE, are revealed, and thus security is increased.

In some examples, a database storing encrypted data starts (e.g., encrypted data is stored, no queries have been executed) in a completely secure mode (cold mode). Decryption operations are required, when querying the database starting from the cold mode. Consequently, the database transforms into a less secure mode (hot mode). The hot mode is efficient, because little to no decryption operations are necessary, and queries can be processed on the data as is. In some examples, this transformation is never reversed. More particularly, because information is leaked during the transformation from the cold mode to the hot mode, there is no reason to again encrypt the data. This lack of reversion has the negative consequence that the database may ultimately reach a state that has columns encrypted using only OPE. Consequently, in a long running database (e.g., a database that has been available for querying for a relatively long time and/or that has been queried a relatively high number of times), adjustable encryption may be no better than pure OPE.

In some examples, the set of all queries that can be applied to the encrypted database determines the encryption level, even if some queries contribute little to the overall load of the database. Particularly, the long tail of the query distribution may have a negative effect on security. These queries are infrequently executed (e.g., only once), but have the same impact on security as the most frequently reoccurring queries.

In view of this, implementations of the present disclosure provide a mechanism for dealing with infrequent queries. In some implementations, infrequent queries are identified, and are processed using searchable encryption. In general, searchable encryption is a randomized, strongly secure encryption scheme where the key holder can issue tokens for particular queries (e.g., equality, range). In some examples, searchable encryption includes multiple operations. For example, encryption transforms a keyword-plaintext pair (e.g., keyword-value pair) into a ciphertext using a secret key. The secret key can be used to generate a search token for a specific keyword. Using the search token, a set of ciphertexts can be searched for ciphertexts that match the keyword. In this manner, data can be encrypted, but still searched without decryption. In some examples, all data, for which no token has been issued, remains semantically secure.

Implementations of the present disclosure provide intelligent encryption selection to select between encryption types (e.g., searchable encryption, OPE, deterministic encryption (DET)). As described in further detail herein, searchable encryption is used until a predefined cost threshold has been achieved, and only then is decryption used. In this manner, the time to transform from the cold mode to the hot mode is increased, while infrequent queries are processed using searchable encryption.

Figure 1:
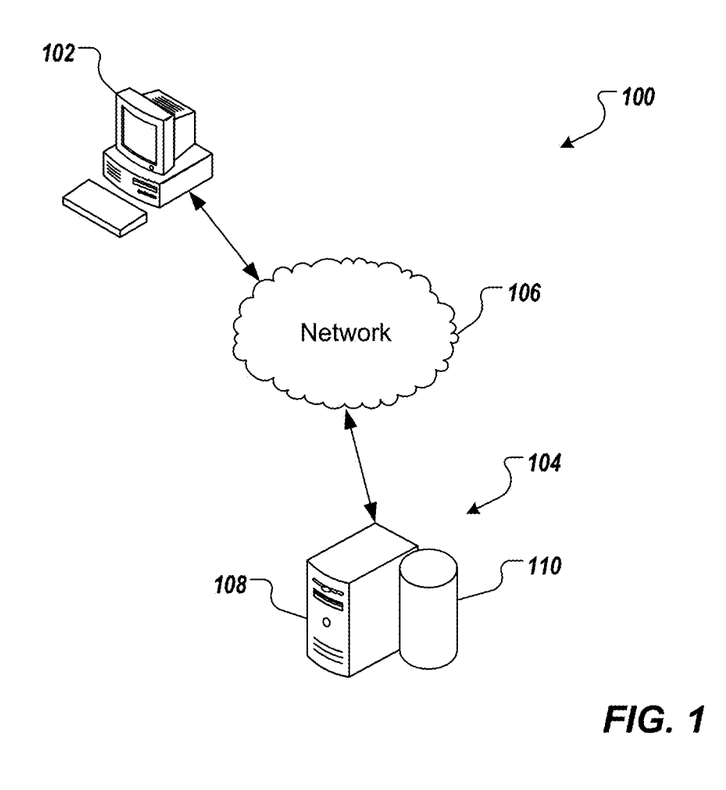
FIG. 1 depicts an example high-level architecture in accordance with implementations of the present disclosure.

FIG. 1 depicts an example high-level architecture 100 in accordance with implementations of the present disclosure. The high-level architecture 100 includes a computing device 102, e.g., client-side, a server system 104 and a network 106. In some examples, the computing device 102 and the server system 104 communicate over the network 106. In some examples, the computing device 102 can communicate with the server device 104 over one or more networks, e.g. the network 106. In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the server device 104 includes at least one server and at least one data store. In the example of FIG. 1, the server device 104 is intended to represent various forms of servers including, but not limited to a web server, an application server, a proxy server, a network server, and/or a server pool. In general, server systems accept requests for application services and provides such services to any number of client devices, e.g., the computing device 102, over the network 106.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In accordance with implementations of the present disclosure, the server system 104 can maintain a database that stores encrypted data, e.g., an encrypted database. In some examples, the data is encrypted at the computing device 102, and the encrypted data is sent to the server system 104 over the network 106 for storage. In some implementations, and as described herein, the server system 104 can be provided by a third-party service provider, which stores and provides access to the encrypted data.

In some implementations, the database is part of a database system that also includes a query execution engine. In some examples, the query execution engine receives a query (e.g., a search token from a client), provides a query plan based on the query, executes the query plan to provide a response (e.g., encrypted data from the database that is responsive to the query), and transmits the response to the client (e.g., from which the query was received). In some examples, and as described in further detail herein, the query execution engine performs encryption selection in accordance with implementations of the present disclosure. In some examples, and as described in further detail herein, the query execution engine communicates with a module that performs encryption selection in accordance with implementations of the present disclosure.

Figure 2:
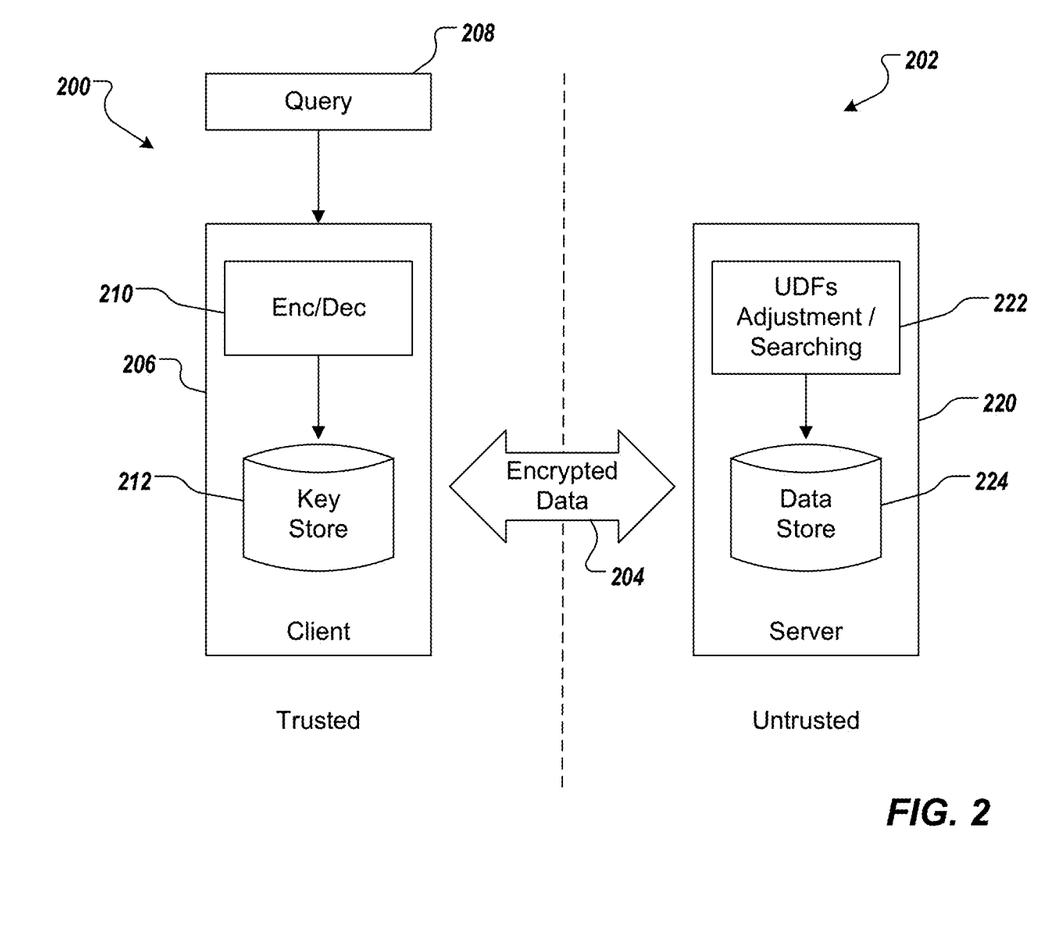
FIG. 2 depicts trust assumptions in an outsourced database service model.

FIG. 2 depicts trust assumptions in an outsourced database service model. In the depicted example, a trusted side 200 and an untrusted side 202 are provided, between which, encrypted data 204 is exchanged. In some examples, the trusted side 200 corresponds to a customer-side (e.g., client-side), and the untrusted side corresponds to a third-party service provider (e.g., a cloud storage service provider). The trusted side 200 includes a client 206 and a query 208. In some examples, the client 206 includes an encrypt/decrypt module 210 and a key store 212. The untrusted side 202 includes a server 220 having a UDF and adjustment/searching module 222 and a data store 224. In some examples, the data store 224 stores encrypted data that is to be queried. In some examples, the client 206 is provided in the computing device 102 of FIG. 1, and the server 220 is provided in the server system 104 of FIG. 1.

In some implementations, the client 206 receives the query 208, the query encrypt/decrypt module 210 encrypts the query to provide a search token using an appropriate key from the key store 210. The search token is provided to the server 220. In some examples, the UDF and adjustment/searching module 222 performs encryption selection, as described in further detail herein, at least partially based on the search token and encryption levels of implicated columns. Encrypted data that is responsive to the search token is retrieved from the data store 224 and is transmitted to the client 206. The client 206 decrypts the encrypted data to provide a plaintext search result for the query 208.

Security is a major concern for outsourced databases. In the database-as-a-service model, an independent service provider offers its database to clients. The clients need to entrust their data to the cloud service provider without having control over unwanted disclosures (e.g., to insiders or hackers). The solution to this outsourced security problem is to encrypt data before sending it to the (cloud) database for storage. The key (encryption/decryption key) remains at the client (the key holder). This is easy to implement for simple storage, but the clients must remain able to query the database.

In some implementations, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An in-memory database system can be contrasted with database management systems that employ a disk storage mechanism. In some examples, in-memory database systems are faster than disk storage databases, because internal optimization algorithms can be simpler and execute fewer CPU instructions, e.g., require reduced CPU consumption. In some examples, accessing data in an in-memory database system eliminates seek time when querying the data, which provides faster and more predictable performance than disk-storage databases. In some examples, an in-memory database can be provided as a column-oriented in-memory database, in which data tables are stored as sections of columns of data (rather than as rows of data). In some examples, in-memory databases compress the data stored therein. An example compression technique includes dictionary compression, which is usable with DET and OPE.

Encryption selection in accordance with implementations of the present disclosure enable multi-objective optimization of a query plan. In some examples, either a more efficient query plan, or a more secure query plan is selected. More particularly, and as described in further detail herein, different query plans—using different encryption schemes—are implemented for addressing the trade-off between security and performance in querying on encrypted data. In some examples, a query plan includes one or more operators that are to be performed to execute the query. In some examples, a query plan can be provided as a tree, where nodes of the tree are the operators and edges represent a control flow, e.g., results of a child operator are provided as input to a parent operator. For example, each operator reads input columns either from a data source, e.g., a table, or from its child nodes, and produces output columns that are returned to a parent node. In some examples, executing the query amounts to calling the root node iterator. In some examples, for read scenarios, data is "pulled" from tables, such that the data flow is opposite to the direction of the edges. In some examples, the leaves of the tree are scanning operators on the tables or indices as stored in the database. In between the scanning operators, index access, sorting, joining and aggregation operators can be provided.

As part of the query plan, each operator is assigned an encryption level. This operator encryption level corresponds to the maximum data encryption level possible that can still execute the operator correctly. For example, and as descried herein, DET is sufficient for an aggregation operator that includes a "group by" clause. As another example, and as described herein, OPE is necessary for sorting.

OPE, DET, and homomorphic encryption (HOM) can be used to query encrypted data. Each encryption scheme has respective algebraic properties. In some examples, encryption of plaintext x to provide ciphertext c can be denoted as:

$$c = E_T(x)$$

where T is the encryption type (e.g., T∈{OPE, DET, HOM}). In some examples, decryption of ciphertext c to provide plaintext x can be denoted as:

$$x = D_T(c)$$

OPE preserves the order of plaintexts. This can be described as:

$$x \leq y \Longleftrightarrow E_{OPE}(x) < E_{OPE}(y)$$

where x and y are plaintext. DET preserves equality of plaintexts. This can be described as:

$$x = y \Longleftrightarrow E_{OPE}(x) = E_{OPE}(y)$$

In HOM, multiplication of ciphertexts (modulo α key-dependent constant) maps to addition of the plaintexts. This can be described as:

$$D_{HOM}(E_{HOM}(x) \cdot E_{HOM}(y)) = x + y$$

Using these algebraic properties, relational operators for most queries can be performed on the encrypted data (the ciphertext) without decrypting the encrypted data. For example, a table scan operation with equality or range selection conditions can be performed without decrypting the encrypted data. Such operations can be performed, for example, on OPE-encrypted data and/or DET-encrypted data. As another example, join operations can be performed, for example, on OPE-encrypted data and/or DET-encrypted data. In another example, grouping (e.g., group by clause) can operate on DET-encrypted data. In some examples, data functions, (e.g., minimum, maximum, counting) can be performed on the encrypted data. In some examples, it is not necessary to modify the relational operator implementation compared to a regular, non-encrypted database implementation. The operators perform the same computation on the ciphertexts as they would on the plaintexts.

In some examples, for aggregation operations (e.g., sum, average) HOM is used. For example, if the database multiplies the (selected) ciphertexts, a ciphertext of the aggregate is provided. This requires only a small change to the operator implementation, which can be provided by user-defined functions. In this manner, a large subset of queries can be performed on encrypted data using the appropriate encryption type. However, a customer should still be able to choose the encryption type that is appropriate for their data. Encryption types, however, have different security levels and may be incompatible.

Incompatible encryption makes executing a query impossible. For example, a range query cannot be performed on HOM-encrypted data. As another example, combinations of encryption schemes may be required by specific queries. The following example query can be considered:

SELECT x FROM T GROUP BY y HAVING SUM(z)>100

In this example, the sum function requires HOM and the greater-than comparison requires OPE. Such queries cannot be executed on encrypted data in the server-side database, because no appropriate encryption scheme exists.

Further, different encryption types have different security levels. For example, HOM, such as Paillier's encryption scheme, is semantically secure. Semantic security means that it is computationally impossible to distinguish two ciphertexts, even if the adversary may choose their plaintexts. Semantic security implies that ciphertexts are randomized (e.g., equality is not preserved under encryption). In some examples, DET leaks this equality and is therefore less secure. Security guarantees have been established under the assumption that the plaintexts have high entropy. In some examples, OPE is not only deterministic, but also leaks the order of the plaintexts, and is therefore, less secure.

In view of the foregoing, HOM (standard encryption) is more secure than DET, which is more secure than OPE. In some examples, HOM can be said to be greater than DET, and DET can be said to be greater than OPE, from a security point-of-view. Accordingly, a first encryption type can be compared to a second encryption type to determine whether the first encryption type is less than or equal to the second encryption type. For example, if the first encryption type is OPE and the second encryption type is DET, it can be determined that the first encryption type is less than the second encryption type. As another example, if the first encryption type is DET and the second encryption type is DET, it can be determined that the first encryption type is equal to the second encryption type. As another example, if the first encryption type is HOM and the second encryption type is DET (or OPE), it can be determined that the first encryption type is not less than or equal to the second encryption type.

The foregoing observation implies that the client should carefully choose its encryption types for data outsourcing. For example, OPE or DET should be used, if it is necessary to enable particular queries and achieve the highest security level. However, the set of to-be-executed queries may be unknown at design-time (e.g., when selecting encryption types before encrypting and storing encrypted data in the database). In some examples, and to address this, randomized encryption (RND) is provided, which enable retrieval, but not queries. OPE enables a superset of queries to deterministic encryption. Consequently, RND, DET and OPE can provide a layered ciphertext, referred to as onion. For example, for each plaintext x, the following example sequence of encryptions (onion) can be provided:

$E_{RND}(E_{DET}(E_{OPE}(x)))$

Initially, the example onion only allows retrieval due to RND. In some examples, when the client encounters a query that requires DET, (e.g., a selection using equality), the encrypted database is updated. For example, the client-side device sends the key $D_{RND}(\ )$ to the database for decrypting the RND (first onion layer). In some examples, the database uses a user-defined function to perform the update, such that the database stores:

$E_{DET}(E_{OPE}(x))$

This enables the new query (e.g., a selection using equality) to be executed.

This can be repeated in the case of a query that requires OPE to execute. For example, the client-side device sends the key $D_{DET}(\ )$ to the database for decrypting the DET (second onion layer). In some examples, the database uses a user-defined function to perform the update, such that the database stores:

$E_{OPE}(x)$

In some examples, HOM is handled differently and is stored in a separate column. For example, the separate column enables aggregation operations, but does not harm security, because HOM is semantically secure. Accordingly, layering is not possible with HOM, because HOM needs to encrypt the plaintext x for the correct result in aggregation operations.

The above-described approach (layering) is referred to as adjustable encryption, introduced above, because it represents an adjustment mechanism of the database to the series of executed queries. Adjustable encryption enables dynamic adjustment of encryption types without knowing all queries in advance. Furthermore, the adjustment is unidirectional. That is, once decrypted to DET or OPE, it is not necessary to return to a higher encryption level to enable a subsequent query. Security against the cloud service provider has already been weakened, because the less secure ciphertext (e.g., second onion layer, third onion layer) has been revealed at least once and can therefore be used in cryptanalysis.

As introduced above, implementations of the present disclosure use searchable encryption as an alternative to DET and OPE in adjustable encryption. More particularly, and as described in further detail herein, searchable encryption is used for infrequent queries. In this manner, security is improved by sacrificing performance of queries on columns that are rarely used.

In some examples, searchable encryption enables the (private) key holder (e.g., the customer) to issue a search token for a query string. Using the search token, the ciphertext holder (e.g., the third-party service provider) can compare a ciphertext to the query string. The result of this comparison (e.g., match, no match) is immediately revealed in plaintext. Searchable encryption exists for symmetric-key and public-key encryption. In some implementations, the symmetric-key variant is used due to better performance and the lack of need for a public key.

In some implementations, a searchable encryption of the present disclosure includes the following example operations: $sk \leftarrow KeyGen(\lambda)$, which generates a secret key sk for a security parameter $\lambda$; $c \leftarrow Enc(sk, x)$, which encrypts the plaintext x into the ciphertext c using the secret key sk; $t \leftarrow TrapDoor(sk, x)$, which generates a trapdoor search token t for plaintext x using secret key sk; and $T/\bot \leftarrow Test(t, c)$, which returns T if the search token matches and $\bot$ if the search token does not match.

In some implementation, the ability to decrypt is optional (e.g., another encrypted column of the same data can be used for decryption). Correctness of searchable encryption can be defined as:

$\forall sk \leftarrow KeyGen(\lambda)$ $\forall x$ $\forall c \leftarrow Enc(sk, x)$ $\forall t \leftarrow TrapDoor(sk,x)$ $Test(t,c) = T$ In some examples, $x \not\leftarrow y$ denotes the assignment of any value different from y to x, where soundness of searchable encryption is defined as:

$Pr[\forall sk \leftarrow KeyGen(\_)$ $\forall x$ $\forall c \leftarrow Enc(sk, x)$ $\forall t \not\leftarrow TrapDoor(sk,x)$ $Test(t,c) = T] < 1/poly(\lambda)$ In general, searchable encryption is semantically secure except for ciphertexts, for which a respective search token has been revealed. Security of searchable encryption is defined by the following game:

1. A challenger (customer) runs the $KeyGen(\lambda)$ operation to generate sk.
2. An attacker (adversary $\mathcal{A}$) can adaptively ask the challenger for the ciphertext c or the trapdoor t for any plaintext x of its choice.
3. At some point, the attacker sends the challenger two plaintexts $x_o, x_1$ on which it wishes to be challenged. The only restriction is that the attacker did not previously ask for the trapdoors. The challenger picks a random $b \in \{0, 1\}$ and gives the attacker $\tilde{c} = Enc(sk, x_b)$.
4. The attacker can continue to ask for ciphertexts c or trapdoors t for any plaintext x of its choice, as long as $x \in \{x_0, x_1\}$.
5. Eventually, the attacker outputs $b' \in \{0, 1\}$ and wins the game if b=b'. In other words, the attacker wins the game, if it can correctly guess whether it was given the ciphertext for $x_0$ or $x_1$. The attacker's advantage in breaking searchable encryption can be provided as:

$Adv(\lambda) = |Pr[b=b'] - \frac{1}{2}|$

In some examples, semantic security against an adaptive chosen plaintext attack is defined as:

$$Adv(\lambda) < \frac{1}{\text{poly}(\lambda)}$$

In some implementations, searchable encryption is used with a block cipher $F_k$ (e.g. advanced encryption standard (AES)) with key k in electronic codebook (ECB) mode. In some examples, sk is a secret key of the block cipher. To encrypt a plaintext x, a random (e.g., uniformly random) bit sequence r of length of the block size of $F_k$ is chosen, and the ciphertext c is obtained. For example:

$$c = \text{Enc}(sk,x) = (r, F_{F_{sk}(x)}(r))$$

To generate a trapdoor t, the plaintext x is encrypted using the block cipher. For example:

$$t = \text{TrapDoor}(sk,x) = F_{sk}(x)$$

The test operation encrypts the plain r in the ciphertext and compares it to the second part. For example:

$$\text{Test}(t,c) = F_t(r) =^? F_{F_{sk}(x)}(r)$$

In some implementations, range queries are provided and are match-revealing (e.g., in case of a match, the range may be revealed). In some examples, only symmetric encryption is implemented, and is therefore orders of magnitude faster (e.g., relative to match-concealing searchable encryption).

In some implementations, an upper limit m of the plaintext domain is provided, and an interval $I = I_m = \{0, 1, \ldots, 2^m - 1\}$. In some examples values in I are encrypted in such a way that there is an efficient way to issue query tokens for a subinterval $J \subseteq I$, which enables a determination as to whether the ciphertext of a value v satisfies a predicate $p_J(v) := (v \in J)$. The ciphertext c is provided as a tuple that includes randomized searchable encryption ciphertexts.

In some implementations, a set $\mathcal{J}$ of all sub-intervals of I of the form $[k2^i, (k+1)2^i]$ is considered (for non-negative integers k, i) only (e.g., the intervals whose length is a power of two and which are "aligned" (in the sense that their lower border is a multiple of the length)). In some examples, the following observations are provided: any point $v \in I$ naturally determines m such intervals it is contained in; and any sub-interval $J \in I$ can be decomposed into at most 2 m−1 intervals from I.

In some examples, the set of all intervals $\mathcal{J}(v) = \{J \in \mathcal{J} \mid v \in J\}$ of the special form which contain v, is assigned to each value $v \in I_m$. Because, for any given v and $i \in \{0, 1, \ldots, m-1\}$ there is exactly one matching k the set $\mathcal{J}(v)$ contains exactly m such intervals. All possible intervals are mapped to some unique identifier in a deterministic and easy to calculate manner. In some examples, for $J \in \mathcal{J}$, D(J) is the corresponding identifier. Because I contains $2^{m-i}$ intervals of length $2^i$ (for i=0, 1, ... m−1), there are $2^{m+1} - 1$ elements in $\mathcal{J}$. Consequently, m(m+1) bits are sufficient to store the m intervals associated to any $v \in I$.

In some implementations, it is assumed that a subinterval $J \subseteq I$ is provided, which is the (disjoint) union $J = J_1 \cup \ldots \cup J_k$ of intervals from $\mathcal{J}$. Consequently, $v \in J$ if and only if $v \in J_i$ for some i=1, ..., k, and the latter is true, if and only if $\{J_i | 1 \le i \le k\} \cap \mathcal{J}(v) \ne \emptyset$. This relation can be checked for the identifiers instead of the intervals themselves. Consequently:

$$v \in J \iff \{D(J_i) | 1 \le i \le k\} \cap \{D(K) | K \in \mathcal{J}(v)\} \ne \emptyset$$

Doing this check in a straight forward way requires $O(m^2)$ comparisons. However, the sets in the intersection can be pre-sorted and hence the effort can be reduced to $O(m)$.

In some implementations, a scan of symmetric searchable encryption can either be linear-based or index-based. The use of an index reduces search time, because each distinct plaintext is tested only once. In some examples, implementing a (secure) index requires modification of the relational operator. Such a modification is not only space inefficient due to the size of the indices, but also limits the general applicability of the approach. Every column and every possible conjunction and disjunction would need to be equipped with an index (for the entire row). Implementations of the present disclosure use linear scan in order to integrate searchable encryption into the database engine.

In some implementations, searchable encryption (SEARCH) is provided as a user-defined function (UDF). For the ciphertext c stored in the database and a trapdoor t, UDF (c, t) implements the Test (c, t) operation of searchable encryption. Each row (i.e., an entire column) is scanned using the UDF including duplicate plaintexts. This mode of integration enables the use of all table scan operators on the ciphertexts. Consequently, almost the entire query language (e.g., SQL) functionality can be used, as well as processing searchable encryption (instead of DET and OPE) in selections. For additional functions, such as grouping or joins, DET can be used, and, for aggregation, HOM can be used.

As described in further detail herein, implementations of the present disclosure enable detection and handling of infrequent queries. More particularly, implementations of the present disclosure use searchable encryption for infrequent queries, instead of DET or OPE. In some examples, searchable encryption in the UDF can handle selection similar to DET and OPE, but at higher security and lower performance. Infrequent queries are identified, such that an appropriate encryption can be selected (e.g., searchable encryption, DTE, OPE) to keep any impact on performance low, while enhancing the relative gain in security.

Implementations of detecting and handling infrequent queries are described in further detail with reference to an example. The example includes an adjustably encrypted database and the following two sequences A and B of queries:

Sequence A:
SELECT x FROM T WHERE y>10
SELECT x FROM T WHERE y>10
SELECT x FROM T WHERE y>10
SELECT x FROM T WHERE y>10
SELECT x FROM T WHERE y>10
Sequence B:
SELECT x FROM T WHERE y=10
SELECT x FROM T WHERE y>10
SELECT x FROM T WHERE y=10
SELECT x FROM T WHERE y=10
SELECT x FROM T WHERE y=10

In some examples, using the standard adjustment algorithm, both sequences result in an OPE of column y. However, if in sequence B, the second query is processed using searchable encryption, the security would remain at DET and any adverse impact to performance would be relatively small. Implementations of the present disclosure address identifying and handling queries, such as sequences A and B, as an infrequent query. In some examples, this problem can be described as a scheduling problem, in which an optimizer makes a decision based on future inputs (queries). The decision problem in case of the first query of sequence A and the second query of sequence B are almost identical. A query requiring a database adjustment appears for the first time, and an optimizer has to decide whether to use searchable encryption or to decrypt. In some implementations, first-time appearing queries are treated as infrequent queries until they reach a specified threshold, then decrypt if the threshold is exceeded.

In view of this, implementations of the present disclosure use a budget mechanism to identify infrequent queries. In some examples, for each column col of an encrypted database, a budget budget[col] is provided. In some examples, each budget describes the extra amount of time allowed for searchable encryption (compared to DET or OPE) for the respective column. In some examples, each budget can be maintained in an arbitrary but fixed unit of time (e.g., milliseconds). In accordance with implementations of the present disclosure, for each column, searchable encryption is used until the budget is used up (i.e., reaches 0). Once the budget expires, encryption switches from searchable encryption to other encryption schemes (e.g., DET, OPE).

In some implementation, parameters $\alpha$ and $\beta$ are provided. In some examples, whenever a query is executed the parameter $\alpha$ is added to the budget of the respective column(s). In some examples, the parameter $\beta$ defines an upper bound of the budget. That is, the budget is never increased beyond $\beta$. In some examples, when searchable encryption is used, the additional cost of the query is deducted from the budget. In some examples, $\sigma$ is the cost of searchable encryption for equality operations, and $\tau$ is the cost of searchable encryption for ranges. In some implementations, this process, which is described in further detail below with reference to FIG. 3, can be run for several different sets of columns. For example, a query (e.g., SQL query) can use a number of columns, not only the ones in selection.

Implementations of the present disclosure provide a plurality of update strategies, each update strategy being used to choose the column(s) to be updated. In a first strategy S1, the budget is increased for all columns used as selection parameters. In a second strategy S2, the budget is increased for all columns occurring in the query in any role (e.g. also in the result list). In a third strategy S3, the budget is increased for all columns of all tables occurring in the query. In a fourth strategy S4, the budget is increased for all columns of the database scheme used. It is appreciated that the above-described strategies are example strategies and are not exhaustive of strategies that could be implemented.

By way of example, a database with tables $T_1 = \langle a, b, c \rangle$ and $T_2 = \langle d, e \rangle$, where a, b, c, d, e are respective columns, and query SELECT b FROM $T_1$ WHERE a=10 is to be processed. The following example table indicates, which columns are refilled for the respective strategies described above:

TABLE 1

Example Strategies

| Strategy | Refilled Columns |
|---|---|
| S1 | a |
| S2 | a, b |
| S3 | a, b, c |
| S4 | a, b, c, d, e |

It can be noted that, the budget is decreased only for those columns, for which searchable encryption is used instead of OPE or DET.

In some implementations, costs $\sigma$ and $\tau$ depend on the number of rows, to which the test function needs to be applied. For simple scans on complete database tables this number is readily available. However, as soon as there are other selection conditions, which narrow the result set, the test function is first applied. Consequently, the actual number of rows the function acts on is estimated. In some implementations, it is assumed that the selection conditions occurring in the queries are independent and reduce the result set by a fixed factor.

The following example listing describes an implementation of

Listing 1: Encryption Selection

Figure 3:
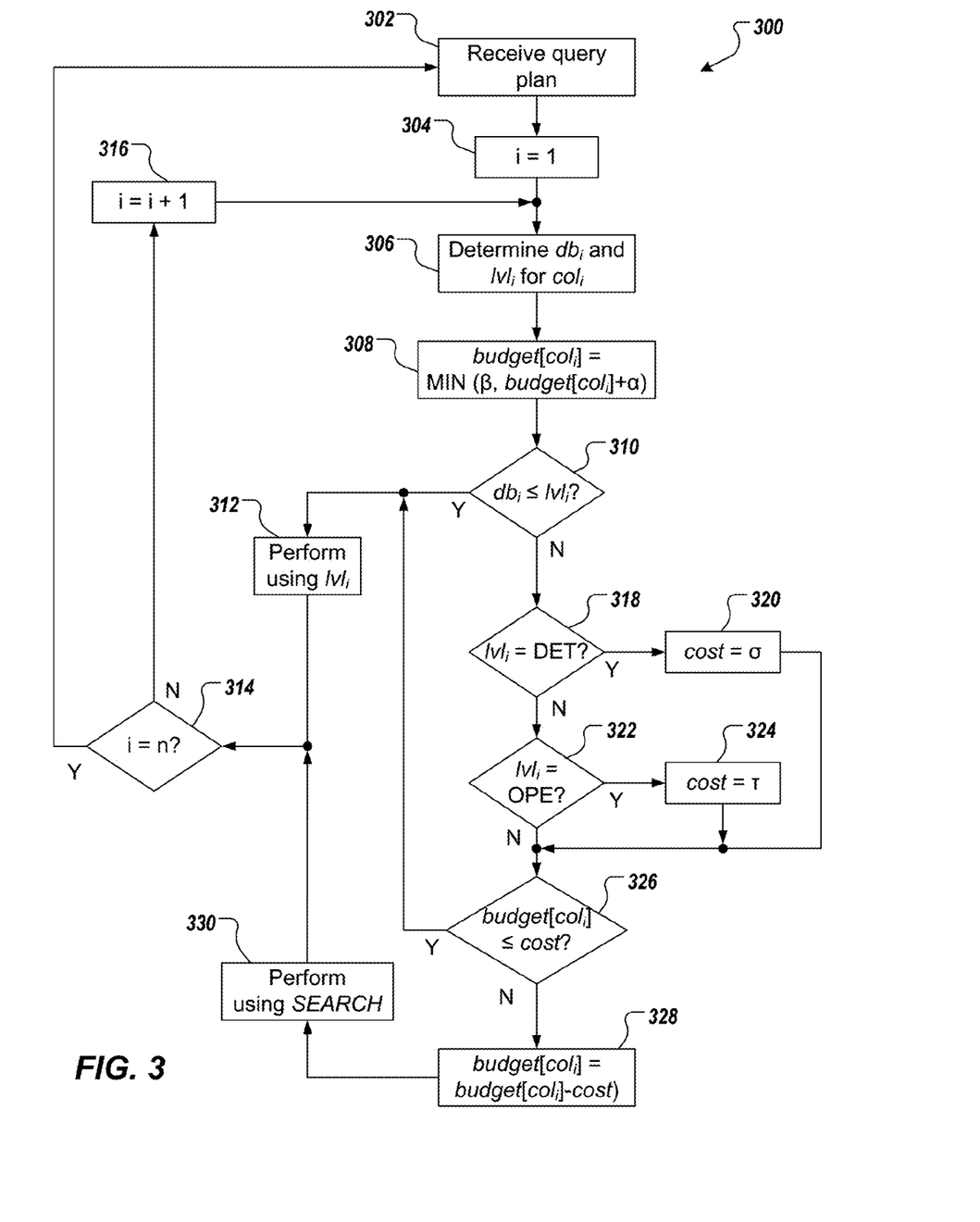
FIG. 3 depicts an example process that can be executed in accordance with implementations of the present disclosure.

Input:
    col: column of operation
    db: database state of the column (RND, DET, OPE)
    lvl: required database state
Output:
    enc: encryption to use (RND, DET, OPE, SEARCH)
    function SelectEncryption(col, db, lvl)
        budget[col] ← MIN($\beta$, budget[col] + $\alpha$)
        if db ≤ lvl then
            return lvl
        end if
        if lvl == DET then
            cost ← $\sigma$
        else if lvl == OPE then
            cost ← $\tau$
        else cost ← 0
        end if
        if budget[col] ≤ cost then
            return lvl
        end if
        budget[col] ← budget[col] − cost
        return SEARCH
    end function FIG. 3 depicts an example process 300 that can be executed in accordance with implementations of the present disclosure. In some examples, the example process 300 can be provided as one or more computer-executable programs executed using one or more computing devices. In some implementations, the example process 300 is executed by a query execution engine of a database system, described above. In some implementations, the example process 300 is executed by a module (e.g., the client 206 of FIG. 2.

A query plan is received (302). For example, a query plan is provided based on a query, and includes one or more operators and a set of columns that are implicated by the query. In some examples, the set of columns includes one or more columns (e.g., $\mathbb{C} = [col_i, \ldots, col_n]$). In some examples, the set of columns is provided based on a budget update strategy (e.g., $S_1$, $S_2$, $S_3$, $S_4$, described above). That is, the set of columns includes columns that are to be updated based on the budget update strategy that is being applied. A counter i is set equal to 1 (304). In some examples, the counter i tracks the columns in the set of columns that are to be updated.

For $col_i$, $db_i$ and $lvl_i$ are determined (306). For example, $db_i$ can be provided by/from the query execution engine, and indicates the current encryption level of $col_i$. As another example, $lvl_i$ can be provided in the query plan (e.g., provided by/from the query execution engine), and indicates the required level of encryption for at least one operator of the query plan that is to be applied to $col_i$. A current budget for $col_i$ (budget[$col_i$]) is determined (308). In some examples, budget[$col_i$] is determined as the minimum of $\beta$ and budget[$col_i$]+$\alpha$, where budget[$col_i$]+$\alpha$ is provided as the previous budget of $col_i$ (e.g., after the last operator was executed on $col_i$) plus the parameter $\alpha$.

It is determined whether $db_i$ is less than or equal to $lvl_i$ (310). For example, if $db_i$ is OPE and $lvl_i$ is DET, it is determined that $db_i$ is less than $lvl_i$. As another example, if $db_i$ is DET and $lvl_i$ is DET, it is determined that $db_i$ is equal to $lvl_i$. As another example, if $db_i$ is DET and $lvl_i$ is OPE, it is determined that $db_i$ is not less than or equal to $lvl_i$. If it is determined that $db_i$ is less than or equal to $lvl_i$, the operator in question is performed using $lvl_i$ (312). It is determined whether the counter i is equal to n (314). More specifically, it is determined whether all columns in the set of columns have been considered. If the counter i is not equal to n, the counter i is incremented (316), and the example process 300 loops back to consider the next column in the set of columns. If the counter i is equal to n, the example process 300 loops back to consider the next received query plan, if any.

If it is determined that $db_i$ is less not than or equal to $lvl_i$, it is determined whether $lvl_i$ is DET (318). If $lvl_i$ is DET, a cost parameter cost is set equal to a value $\sigma$ (320). If $lvl_i$ is not DET, it is determined whether $lvl_i$ is OPE (322). If $lvl_i$ is OPE, the cost parameter cost is set equal to a value $\tau$. It is determined whether budget[$col_i$] is less than or equal to cost (326). If budget[$col_i$] is less than or equal to cost, the operator in question is performed using $lvl_i$ (312). If budget[$col_i$] is not less than or equal to cost, budget[$col_i$] is decremented by cost (328), and the operator in question is performed using SEARCH. In some implementations, if budget[$col_i$] is not less than or equal to cost, it can first be determined whether, for example, the operator is to be performed using OPE. For example, if, in the same query there is a JOIN operation using the same column together with some other column that is already decrypted to OPE, OPE can be used (even though there is budget available to use SEARCH.

Figure 4:
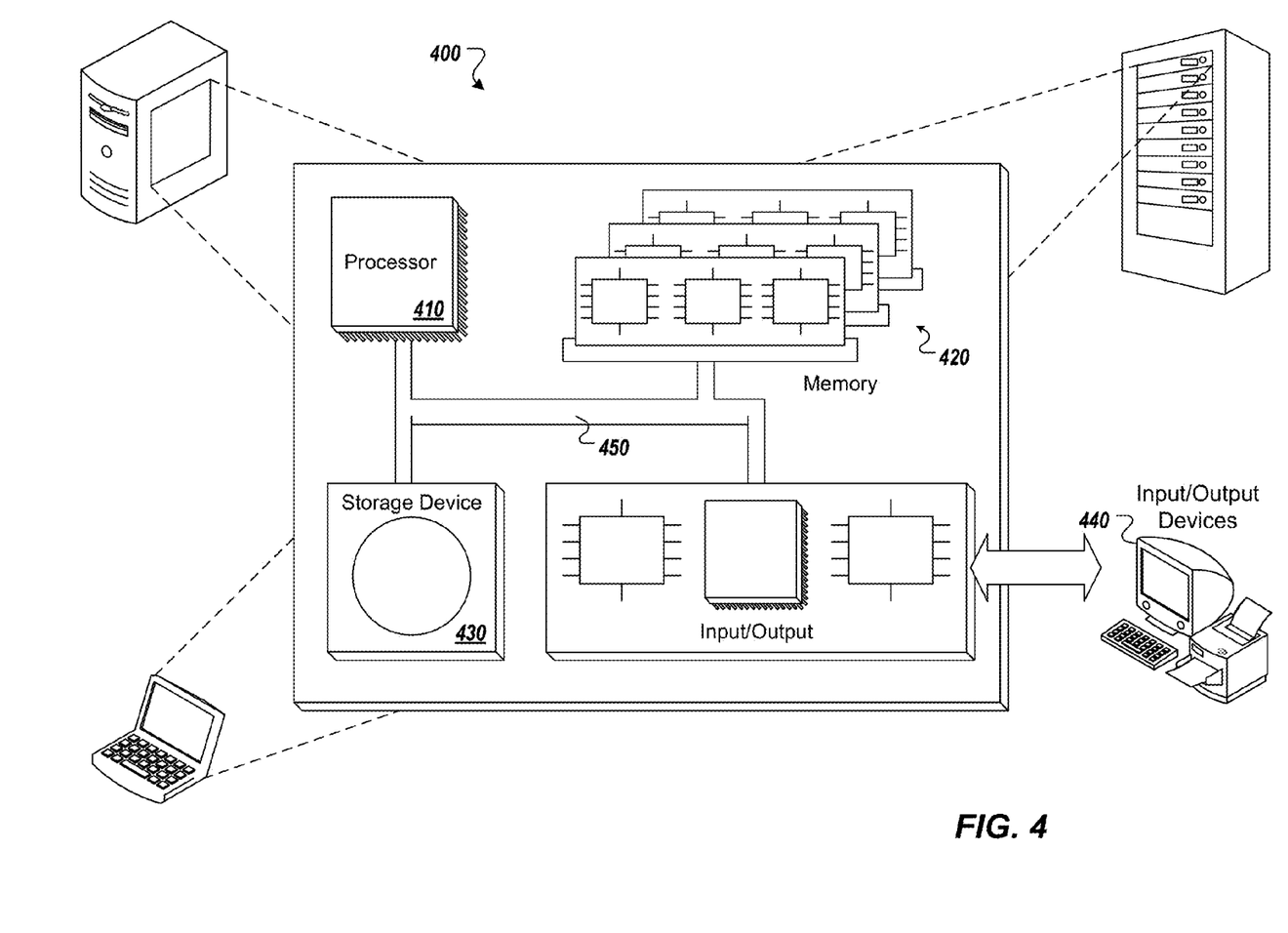
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selecting encryption to perform an operator during execution of a database query, the method being executed using one or more processors and comprising:
   determining, by the one or more processors, a current encryption type of a column that is to be acted on during execution of the database query, the column storing encrypted data;
   determining, by the one or more processors, a minimum encryption type for performance of the operator on the column;
   selecting, by the one or more processors, a selected encryption type based on the current encryption type, the minimum encryption type, and a budget associated with the column; and
   performing, by the one or more processors, the operator based on the selected encryption type.

2. The method of claim 1, further comprising determining the budget associated with the column based on a previous budget associated with the column and a cost parameter.

3. The method of claim 2, further comprising one of setting the cost parameter to a first value, if the minimum encryption type is deterministic encryption, and setting the cost parameter to a second value, if the minimum encryption type is order-preserving encryption.

4. The method of claim 2, wherein the selected encryption type is the minimum encryption type, and is selected in response to determining that the budget is less than or equal to the cost parameter.

5. The method of claim 1, wherein the selected encryption type is searchable encryption, and is selected in response to determining that the budget is not less than or equal to the cost parameter.

6. The method of claim 1, wherein the selected encryption type is the minimum encryption type, and is selected in response to determining that the current encryption type is less than or equal to the minimum encryption type.

7. The method of claim 1, wherein the budget is provided in terms of time.

8. A non-transitory computer-readable storage medium coupled to one or more processors and having instructions stored thereon which, when executed by the one or more processors, cause the one or more processors to perform operations for selecting encryption to perform an operator during execution of a database query, the operations comprising:
   determining a current encryption type of a column that is to be acted on during execution of the database query, the column storing encrypted data;
   determining a minimum encryption type for performance of the operator on the column;
   selecting a selected encryption type based on the current encryption type, the minimum encryption type, and a budget associated with the column; and
   performing the operator based on the selected encryption type.

9. The computer-readable storage medium of claim 8, wherein operations further comprise determining the budget associated with the column based on a previous budget associated with the column and a cost parameter.

10. The computer-readable storage medium of claim 9, wherein operations further comprise one of setting the cost parameter to a first value, if the minimum encryption type is deterministic encryption, and setting the cost parameter to a second value, if the minimum encryption type is order-preserving encryption.

11. The computer-readable storage medium of claim 9, wherein the selected encryption type is the minimum encryption type, and is selected in response to determining that the budget is less than or equal to the cost parameter.

12. The computer-readable storage medium of claim 8, wherein the selected encryption type is searchable encryption, and is selected in response to determining that the budget is not less than or equal to the cost parameter.

13. The computer-readable storage medium of claim 8, wherein the selected encryption type is the minimum encryption type, and is selected in response to determining that the current encryption type is less than or equal to the minimum encryption type.

14. The computer-readable storage medium of claim 8, wherein the budget is provided in terms of time.

15. A system, comprising:
   a computing device; and
   a computer-readable storage device coupled to the computing device and having instructions stored thereon which, when executed by the computing device, cause the computing device to perform operations for selecting encryption to perform an operator during execution of a database query, the operations comprising:
      determining a current encryption type of a column that is to be acted on during execution of the database query, the column storing encrypted data;
      determining a minimum encryption type for performance of the operator on the column;
      selecting a selected encryption type based on the current encryption type, the minimum encryption type, and a budget associated with the column; and
      performing the operator based on the selected encryption type.

16. The system of claim 15, wherein operations further comprise determining the budget associated with the column based on a previous budget associated with the column and a cost parameter.

17. The system of claim 16, wherein operations further comprise one of setting the cost parameter to a first value, if the minimum encryption type is deterministic encryption, and setting the cost parameter to a second value, if the minimum encryption type is order-preserving encryption.

18. The system of claim 16, wherein the selected encryption type is the minimum encryption type, and is selected in response to determining that the budget is less than or equal to the cost parameter.

19. The system of claim 15, wherein the selected encryption type is searchable encryption, and is selected in response to determining that the budget is not less than or equal to the cost parameter.

20. The system of claim 15, wherein the selected encryption type is the minimum encryption type, and is selected in response to determining that the current encryption type is less than or equal to the minimum encryption type.

* * * * *